(12) United States Patent
Gormley

(10) Patent No.: US 9,739,235 B2
(45) Date of Patent: Aug. 22, 2017

(54) THRUST REVERSER FOR A TURBOFAN ENGINE

(71) Applicant: Rohr, Inc., Chula Vista, CA (US)

(72) Inventor: Timothy Gormley, Bonita, CA (US)

(73) Assignee: Rohr, Inc., Chula Vista, CA (US)

( * ) Notice: Subject to any disclaimer, the term of this patent is extended or adjusted under 35 U.S.C. 154(b) by 462 days.

(21) Appl. No.: 14/222,192

(22) Filed: Mar. 21, 2014

(65) Prior Publication Data

US 2015/0267642 A1   Sep. 24, 2015

(51) Int. Cl.
 *F02K 1/72*    (2006.01)
 *F02K 1/76*    (2006.01)
 *F02K 1/80*    (2006.01)

(52) U.S. Cl.
 CPC ............... *F02K 1/72* (2013.01); *F02K 1/763* (2013.01); *F02K 1/80* (2013.01); *F05D 2260/50* (2013.01)

(58) Field of Classification Search
 CPC ... F02K 1/70; F02K 1/72; F02K 1/763; F02K 1/766; F02K 1/62; F02K 1/625
 See application file for complete search history.

(56) References Cited

U.S. PATENT DOCUMENTS

| | | | |
|---|---|---|---|
| 3,829,020 A * | 8/1974 | Stearns | F02K 1/09 181/216 |
| 4,275,560 A | 6/1981 | Wright et al. | |
| 4,278,220 A * | 7/1981 | Johnston | F02K 1/72 244/110 B |
| 5,046,307 A | 9/1991 | Matta et al. | |
| 5,778,659 A * | 7/1998 | Duesler | F02K 1/09 239/265.27 |
| 6,474,059 B2 | 11/2002 | Stretton | |
| 6,845,946 B2 | 1/2005 | Lair | |
| 7,559,507 B2 | 7/2009 | Harrison et al. | |
| 7,600,371 B2 | 10/2009 | Sternberger | |
| 7,690,190 B2 | 4/2010 | Thornock et al. | |
| 8,109,467 B2 | 2/2012 | Murphy | |
| 8,256,204 B2 | 9/2012 | Hatrick | |
| 2009/0321561 A1 * | 12/2009 | Andre | F02K 1/72 244/110 B |
| 2012/0067024 A1 | 3/2012 | Vauchel | |

(Continued)

FOREIGN PATENT DOCUMENTS

FR   2987080   8/2013

OTHER PUBLICATIONS

EP search report for EP15159938.8 dated Sep. 14, 2015.

*Primary Examiner* — Andrew Nguyen
(74) *Attorney, Agent, or Firm* — O'Shea Getz P.C.

(57) ABSTRACT

A thrust reverser of a turbofan engine has a stationary structure, a translating structure capable of moving linearly between a forward position and an aft position, a translating member capable of moving linearly between a forward condition and an aft condition when the translating structure is in the aft position, and a blocker door device engaged pivotally to the translating member and capable of rotating from a stowed state when the translating member is in the forward position and to a deployed state when the translating member is in the aft condition. When the thrust reverser is stowed, the blocker door device is located radially outward from a pressure sleeve of the translating structure and does not substantially obstruct flow in a flowpath defined at least in-part by the pressure sleeve.

11 Claims, 4 Drawing Sheets

(56) References Cited

U.S. PATENT DOCUMENTS

| | | | |
|---|---|---|---|
| 2013/0205753 A1* | 8/2013 | Todorovic | F02K 3/025 |
| | | | 60/226.2 |
| 2013/0280052 A1 | 10/2013 | Gonidec et al. | |
| 2014/0131479 A1* | 5/2014 | Kerbler | F02K 1/72 |
| | | | 239/265.19 |

* cited by examiner

THRUST REVERSER FOR A TURBOFAN ENGINE

BACKGROUND

The present disclosure relates to a thrust reverser for a turbofan engine and more particularly to a blocker door device of the thrust reverser.

Turbofan engines are known to include a fan section that produces a bypass airflow for providing the majority of engine propulsion and a combustion or core airflow for compression, mixing with fuel, combustion and expansion through a turbine to drive the fan section. The engines further include nacelles that partially surround the core of the engine, include a pylon for securing the engine to a structure such as an aircraft wing, and provide an annular bypass airflow duct for directing the bypass airflow in a rearward direction to produce forward propulsion. The nacelles may further include thrust reversers capable of redirecting the bypass airflow from the rearward direction to, at least partially, a forward direction thus producing a rearward propulsion. As an example, such rearward propulsion may serve to decelerate the forward motion of an aircraft soon after landing.

Thrust reversers may include a plurality of blocker doors physically capable of changing positions through mechanical and/or hydraulic linkages from a stowed position for forward propulsion and to a deployed position for rearward propulsion. There exists a need to improve such linkages and reduce linkage obstruction in the bypass airflow duct.

SUMMARY

A thrust reverser according to one, non-limiting, embodiment of the present disclosure includes a translating structure constructed and arranged to move between first and second positions and defining at least in-part a flowpath when in the first position; a translating member constructed and arranged to move between first and second conditions with respect to the translating structure when the translating structure is in the second position; and a blocker door pivotally engaged to the translating member and constructed and arranged to rotate from a first state when the translating member is in the first condition and to a second state when the translating member is in the second condition.

Additionally to the foregoing embodiment, the thrust reverser includes a stationary structure; and a linkage engaged between the blocker door and the stationary structure.

In the alternative or additionally thereto, in the foregoing embodiment, the blocker door is disposed between the translating structure and the translating member when in the stowed state.

In the alternative or additionally thereto, in the foregoing embodiment, the linkage is a drag-less linkage.

In the alternative or additionally thereto, in the foregoing embodiment, the linkage has a first arm movably connected to the blocker door, a second arm movably connected to the first arm and the stationary structure, and a third arm movably connected to the second arm and the translating member.

In the alternative or additionally thereto, in the foregoing embodiment, the thrust reverser includes a pivotal connection engaged to the blocker door and the second segment; a first pivotal joint engaged to the blocker door and the first arm; a second pivotal joint spaced from the first pivotal joint along the first arm and engaged to the first and second arms; a third pivotal joint spaced from the second pivotal joint along the second arm and engaged to the second arm and the stationary structure; a fourth pivotal joint engaged to the second segment and the third arm; and a fifth pivotal joint spaced from the fourth pivotal joint along the third arm and engaged to the second and third arms.

In the alternative or additionally thereto, in the foregoing embodiment, the translating structure is at least in-part cylindrical and concentric to an axis and the blocker door defines in-part the flowpath when diverted.

In the alternative or additionally thereto, in the foregoing embodiment, the thrust reverser includes a stationary inner shell opposing the translating structure and defining in-part the flowpath, and the blocker door includes and spans between a forward edge portion and a distal edge, the pivotal connection is engaged to the forward edge portion, and the distal edge is proximate to the inner shell when in the deployed state for diverting the flowpath.

In the alternative or additionally thereto, in the foregoing embodiment, the translating structure and the translating member are constructed and arranged to move telescopically with respect to one-another.

A thrust reverser for a turbofan engine according to another, non-limiting, embodiment includes a stationary structure; a translating structure movably engaged to the stationary structure; a translating member in moving relationship to the stationary member and the translating structure; and a blocker door device including a blocker door movably engaged to the translating member and a linkage movably engaged to the stationary structure, the translating member and the blocker door.

Additionally to the foregoing embodiment, the blocker door is pivotally engaged to the translating member.

In the alternative or additionally thereto, in the foregoing embodiment, the linkage is pivotally engaged to the stationary structure, the translating member and the blocker door.

In the alternative or additionally thereto, in the foregoing embodiment, the translating structure and the translating member move linearly and along a common direction.

In the alternative or additionally thereto, in the foregoing embodiment, the translating structure and the translating member move along a common axis.

In the alternative or additionally thereto, in the foregoing embodiment, the translating structure includes a pressure sleeve, and when in a forward position the pressure sleeve radially inwardly defines at least in-part a flowpath and the blocker door device is disposed radially outward from the pressure sleeve.

The foregoing features and elements may be combined in various combinations without exclusivity, unless expressly indicated otherwise. These features and elements as well as the operation thereof will become more apparent in-light of the following description and the accompanying drawings. It should be understood, however, the following description and figures are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
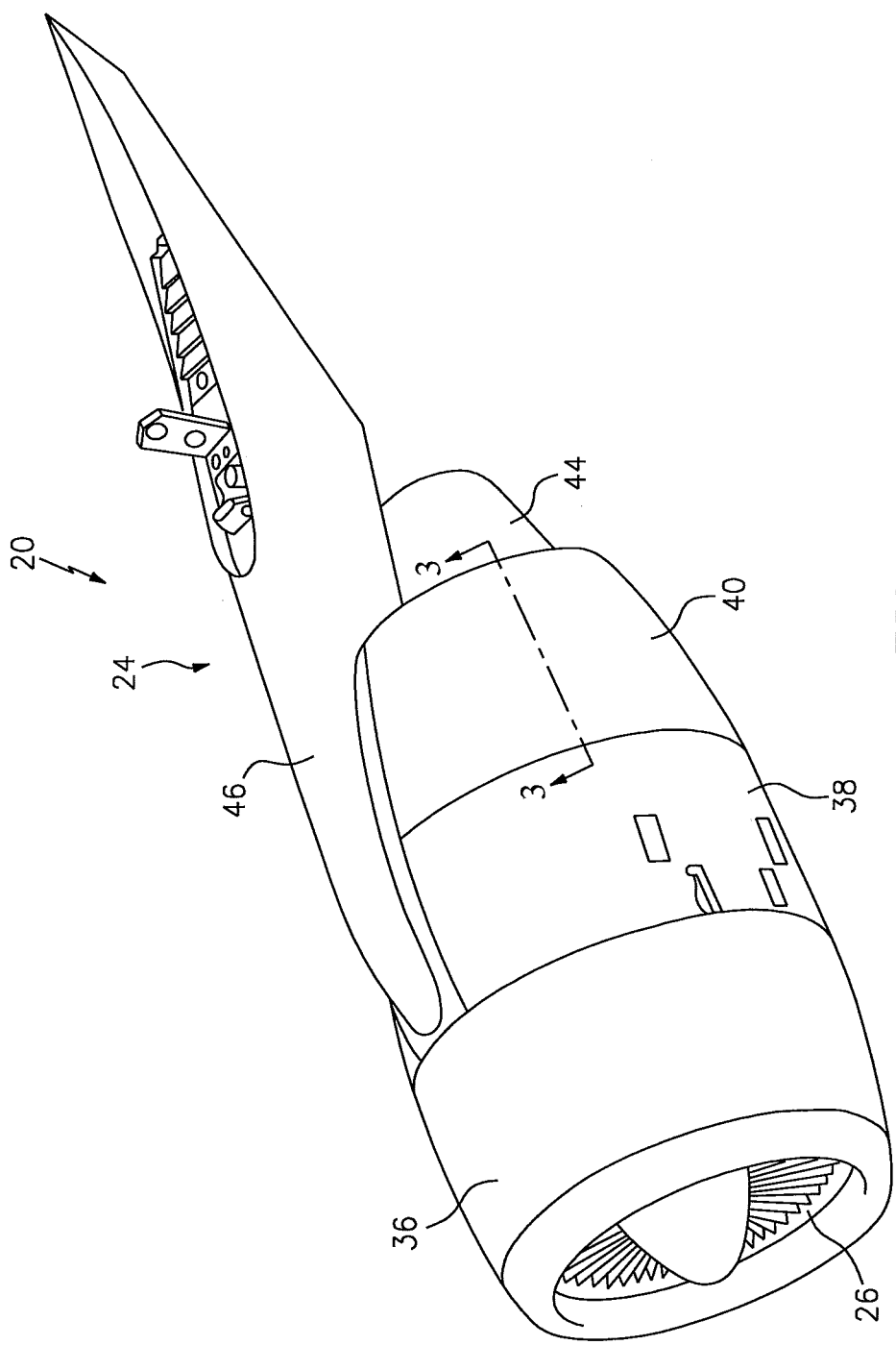
FIG. 1 is a perspective view of a turbofan engine according to one non-limiting embodiment of the present disclosure.
Figure 2:
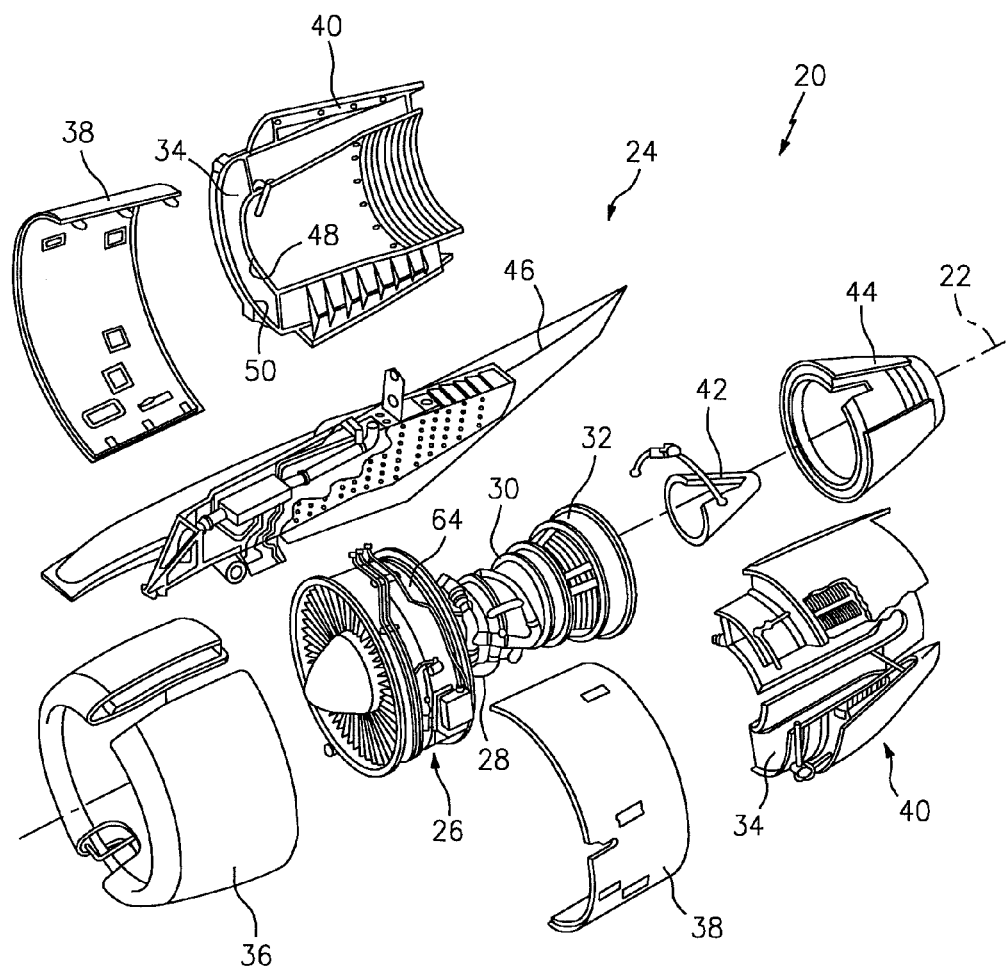
FIG. 2 is an exploded view of the turbofan engine.

Referring to FIGS. 1 and 2, a turbofan engine 20 is centered about an engine axis 22 and includes a nacelle 24 that supports and generally surrounds an inner engine core that includes a fan section 26, a compressor section 28, a combustor section 30 and a turbine section 32. The fan section 26 drives air along a bypass flowpath or duct 34 and the combustor section 30 receives a portion of air from the fan section 26 and drives air along a core flowpath (not shown) for compression by the compressor section 28, then into the combustor section 30. The core air is mixed with fuel in the combustor section 30 and burned producing energy. The core air or exhaust from the combustor section 30 is expanded through the turbine section 32 and, in-turn, drives a central shaft (not shown) that powers the fan section 26.

The combusted core airflow flowing through the turbine generally powers the fan section 26 and the bypass airflow provides the majority of forward propulsion for the engine 20. More traditional turbofan engines may have a bypass airflow to core airflow ratio (i.e. bypass ratio) of about six (6:1). More recent high-bypass ratio engines, such as a geared turbofan engine may have greater bypass ratios and that may exceed ten (10:1).

The nacelle 24 may include an intake cowl 36 disposed forward of the fan section 26, a fan cowl 38 that circumferentially surrounds and shields the fan section 26, a thrust reverser 40 that may circumferentially surround the compressor, combustor and turbine sections 28, 30, 32, an exhaust centerbody 42 aft of the turbine section 32, an exhaust nozzle 44 that is spaced radially outward from the exhaust centerbody 42, and a pylon 46 that supports the engine 20 typically to an undercarriage of an aircraft wing (not shown). The intake cowl 36, the fan section and cowl 26, 38, and the thrust reverser 40 are concentric to the engine axis 22.

Figure 3:
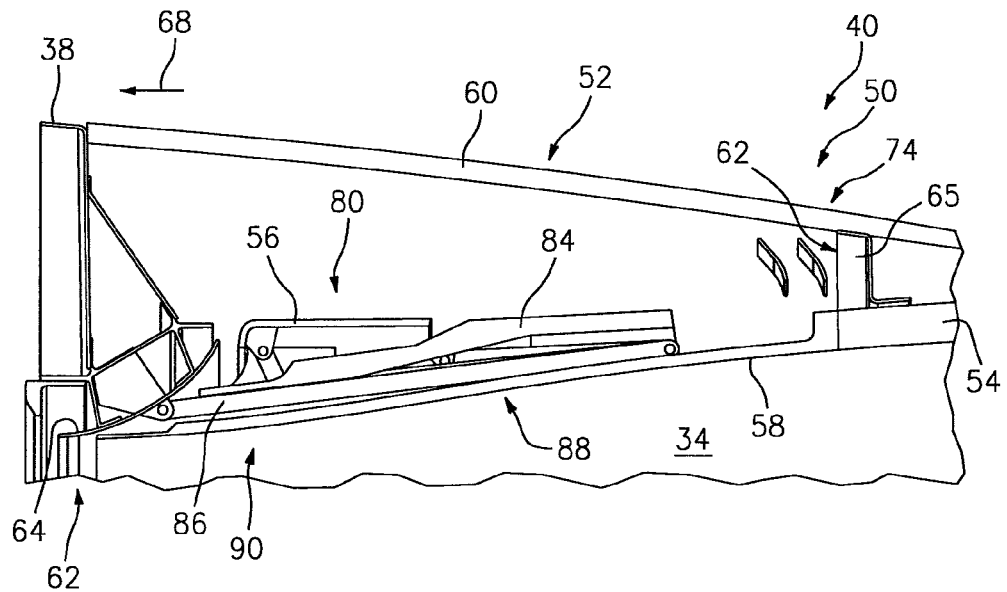
FIG. 3 is a partial cross section of a thrust reverser when stowed, with portions removed to show internal detail, and illustrating a blocker door in a stowed state, a translating member in a forward condition and a translating structure in a forward position, and taken along line 3-3 of FIG. 1.

Referring to FIGS. 2 and 3, the thrust reverser 40 has a radially inner shell 48 and a translating outer shell 50 spaced radially outward from the inner shell 48, and a translating member or sleeve 56. The bypass flowpath 34 is defined by and located radially between the inner and outer shells 48, 50 when the thrust reverser 40 is stowed, may be generally annular in shape, and may be located immediately downstream of the fan section 26. The outer shell 50 may have a forward section or translating structure 52 and an aft section 54. The forward and aft sections 52, 54 may be cylindrical, may be concentric to the engine axis 22, and when the thrust reverser 40 is stowed, may define in-part the bypass flow passage 34. The translating outer shell 50 and the translating member 56 may have telescopic movement with respect to one-another and in an axial direction along the engine axis 22. The term 'telescopic movement' relates to substantial linear movement between two components that are generally cylindrical and collapsible into on-another. That is, when retracted, the two components may be aligned axially, and when extended, one component may be, at least in-part, axially forward of the other component and along a line of motion.

The translating structure 52 may include a cylindrical pressure sleeve 58 and a cylindrical outer casing 60 generally spaced radially outward from the pressure sleeve 58. A stationary structure 62 of the thrust reverser 40 may include a cylindrical fan housing 64 (also of the fan section 26), a cascade ring 65 spaced axially downstream of the fan housing 64, and at least one stationary member 66 (that may be a cylindrical cascade array, see FIG. 4) and spans axially between the fan housing 64 and the cascade ring 65. The pressure sleeve 58 may be aft of the fan housing 64 and rigidly attaches to the casing 60 at a point aft of the cascade ring 65. The stationary member 66 may be rigidly engaged to the fan housing 64 and/or the cascade ring 65.

The outer casing 60 of the translating structure 52 spans axially rearward from the fan cowl 38 and rigidly attaches to the pressure sleeve 58 and may attach to the aft section 54 at a rearward point (not shown). A cross-section of the translating structure 52 may resemble a horse-shoe that is open in an axial forward direction (see arrow 68 in FIG. 3). The stationary member 66 may be generally stored in the translating structure 52 (i.e. radially between the pressure sleeve 58 and the outer casing 60) when the thrust reverser 40 is stowed and may be exposed when the translating structure 52 is translated to the deployed position, as best shown in FIG. 5.

Figure 4:
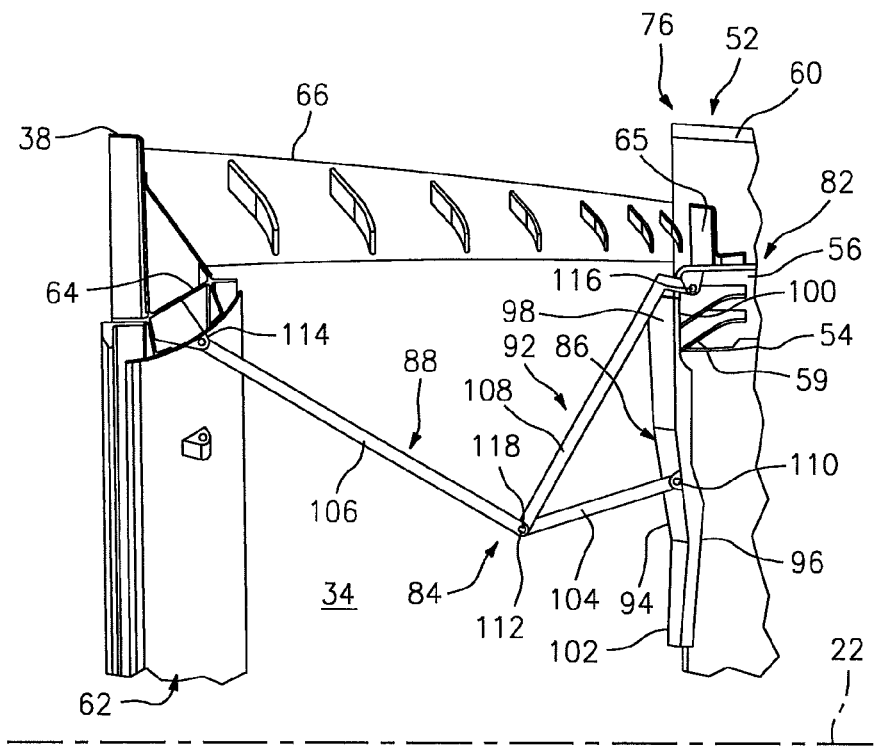
FIG. 4 is a partial cross section of the thrust reverser when deployed, with portions removed to show internal detail, and illustrating the blocker door in a deployed state, the translating member in an aft condition and the translating structure in an aft position.
Figure 5:
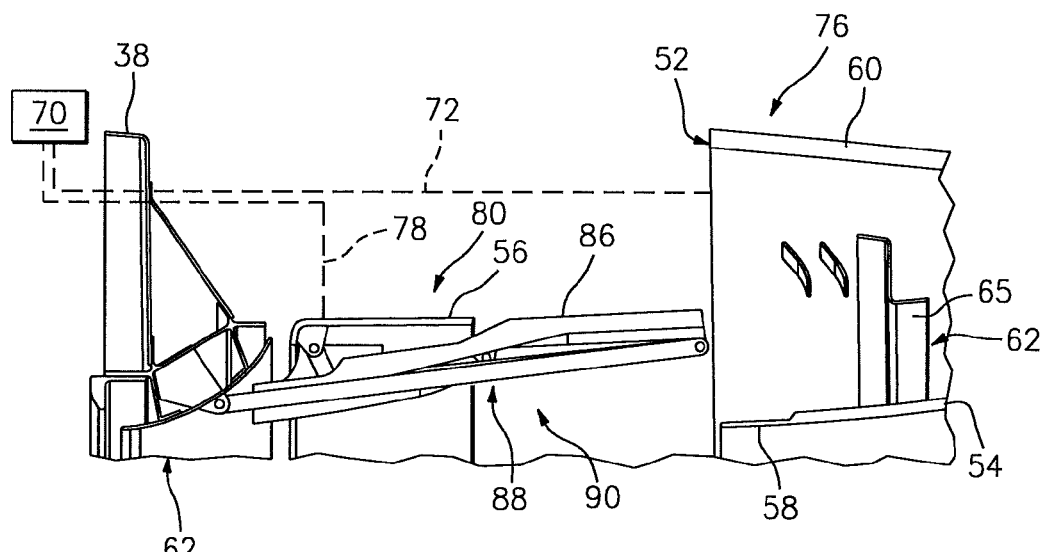
FIG. 5 is a partial cross section of the thrust reverser with portions removed to show internal detail, and with the blocker door in the stowed state, the translating member in the forward condition, and the translating structure in the aft position.
Figure 6:
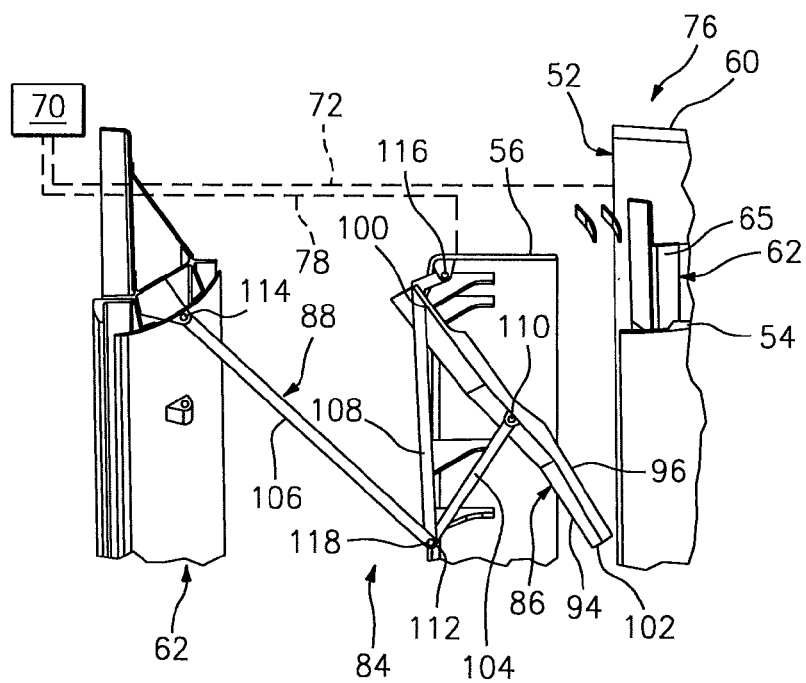
FIG. 6 is a partial cross section of the thrust reverser with portions removed to show internal detail, and with the translating structure in an intermediate position.

Referring to FIGS. 5 and 6, an actuator 70 is schematically illustrated, and may be capable of sequentially driving the translating structure 52 and the translating member 56. The actuator 70 may be any type of sequential drivers known to one skilled in the art. A non-limiting example of one such actuator 70 may include a drive unit rigidly secured to the stationary structure 62, a first link 72 capable of moving the translating structure 52 from a forward position 74 (see FIG. 3) to an aft position 76 (see FIGS. 4-6), and before a second link 78 of the actuator 70 moves the translating member 56 from a forward condition 80 (see FIGS. 3 and 5) to an aft condition 82 (see FIG. 4), and capable of reversing this sequential movement. The links 72, 78 may be hydraulically driven, electrically driven or a combination of both. Although not shown, the translating member 56 may be movably supported by the actuator 70, the stationary structure 62, the translating structure 52, or any combination thereof. The translating structure 52, and as one non-limiting example, may be movably supported by the stationary structure 62 or the aft section 54 of the outer shell 50.

Referring to FIGS. 3 and 4, a plurality of blocker door devices 84 of the thrust reverser 40 are distributed circumferentially about the engine axis 22. Each device 84 has a blocker door 86 that is generally stowed radially outward of the pressure sleeve 58 of the translating structure 52 and spans axially between the fan housing 64 and the aft section 54 of the outer shell 50 (and/or cascade ring 65) during forward propulsion of the engine 20. The blocker door 86 and the translating member 56 of the outer shell 50 are both capable of coincidental movement relative to the translating structure 52 and the stationary structure 62, thereby redirecting bypass airflow in the bypass flowpath 34 that may generally change aircraft power between forward propulsion and reverse propulsion. Each blocker door device 84 may further include a multi-armed, drag-less, linkage 88 capable of providing door stability and guiding movement of the blocker door 86 between a stowed state 90 (see FIG. 3) for forward aircraft propulsion and a deployed state 92 (see FIG. 4) for reverse or rearward aircraft propulsion. When the thrust reverser 40 is stowed, the blocker door device 84 is generally stowed in the translating structure 52 (similar to the stationary member 66) and is located radially between the outer casing 60 and the pressure sleeve 58. Since the blocker door 86 and the linkage 88 are located behind, or radially outward of the pressure sleeve 58, the smooth surface of the pressure sleeve 58 defines in-part the bypass flowpath and no substantial portion of the blocker door device 86 projects into the flowpath 34 or otherwise obstructs flow. This non-obstruction (i.e. drag-less linkage) contributes toward efficient bypass flow and enhances engine operating efficiency during normal flight conditions (i.e. forward engine propulsion).

During initial deployment of the reverse thruster 40, the translating structure 52 of the telescoping outer shell 50 is driven by the actuator 70 from the forward position 74 and to the aft position 76. During this translating structure cycle, the translating member 56 remains in the forward condition 80 and the blocker door 86 remains in the stowed state 90. Once the translating structure 52 nears or reaches the aft position 76, the translating member 56 may be driven by the actuator 70 from the forward condition 80 and to the aft condition 82. During this translating member cycle, the motion of the translating member 56 causes the linkage 88 to rotate the blocker door 86 from the stowed state 90 and into the deployed state 92. When the blocker door device 84 is in the deployed state 92, the translating member 56 has reached the aft condition 82 and the translating member 52 remains in the aft position 76. For stowing of the thrust reverser 40, this process is reversed.

Referring to FIGS. 4 and 6, the blocker door 86 has opposite first and second surfaces 94, 96. When the thrust reverser 40 is stowed, the first surface 94 faces radially inward and opposes the pressure sleeve 58. When the thrust reverser 40 is deployed, the first surface faces, at least in-part, axially upstream and defines in-part the diverted bypass flowpath 34. and the pressure sleeve 58 may no longer define any portion of the flowpath. The blocker door 86 further has and extends between a base or edge portion 98 movably attached to a forward end of the translating member 56 of the outer shell 50 by a pivotal connection 100, and an opposite distal edge 102. When in the stowed state 90, the blocker door 86 spans substantially axially with the edge portion 98 located axially upstream of the distal edge 102. When in the deployed state 92, the blocker door 86 extends substantially radially and the distal edge 88 may be proximate to the inner shell 48.

The linkage 88 may include first, second, and third arms 104, 106, 108 with associated first, second, third, fourth and fifth pivotal joints 110, 112, 114, 116, 118. Each joint 110, 112, 114, 116, 118 and the pivotal connection 100 have respective rotational axis (not shown) that are substantially parallel to one-another. A first end of the first arm 104 is engaged to the blocker door 86 by first joint 110 and an opposite second end of the first arm 104 is engaged to an end of the second arm 106 by the second joint 112. An opposite second end of the second arm 106 is engaged to the fan housing 64 (or stationary structure rigidly engaged thereto) by the third joint 114. An end of the third arm 108 is engaged to the translating member 56 by the fourth joint 116 and an opposite end of the third arm 108 is engaged at or substantially near to an opposite end of the second arm 106 by the fifth joint 118. The second and fifth joints 112, 118 may be at the same location sharing a common axis, or (as a non-limiting example) the fifth joint 118 may be substantially near to the second joint 112 and thus located between the third joint 114 and the fifth joint 118 along the second arm 106. The fourth joint 116 may be spaced axially downstream from the pivotal connection 100.

It is understood that relative positional terms such as "forward," "aft," "upper," "lower," "above," "below," and the like are with reference to the normal operational attitude and should not be considered otherwise limiting. It is also understood that like reference numerals identify corresponding or similar elements throughout the several drawings. It should be understood that although a particular component arrangement is disclosed in the illustrated embodiment, other arrangements will also benefit. Although particular step sequences may be shown, described, and claimed, it is understood that steps may be performed in any order, separated or combined unless otherwise indicated and will still benefit from the present disclosure.

The foregoing description is exemplary rather than defined by the limitations described. Various non-limiting embodiments are disclosed; however, one of ordinary skill in the art would recognize that various modifications and variations in light of the above teachings will fall within the scope of the appended claims. It is therefore understood that within the scope of the appended claims, the disclosure may be practiced other than as specifically described. For this reason, the appended claims should be studied to determine true scope and content.

What is claimed is:

1. A thrust reverser comprising:
   a translating structure constructed and arranged to move between first and second positions and defining at least in-part a flowpath when in the first position;
   a translating member constructed and arranged to move between first and second conditions with respect to the translating structure when the translating structure is in the second position;
   a blocker door pivotally engaged to the translating member and constructed and arranged to rotate from a first state when the translating member is in the first condition and to a second state when the translating member is in the second condition;
   a stationary structure; and
   a linkage engaged between the blocker door and the stationary structure, wherein the linkage is a drag-less linkage;
   wherein the blocker door is disposed between the translating structure and the translating member when in a stowed state.

2. The thrust reverser set forth in claim 1 wherein the linkage has a first arm movably connected to the blocker door, a second arm movably connected to the first arm and the stationary structure, and a third arm movably connected to the second arm and the translating member.

3. A thrust reverser comprising:
   a translating structure constructed and arranged to move between first and second positions and defining at least in-part a flowpath when in the first position;

a translating member constructed and arranged to move between first and second conditions with respect to the translating structure when the translating structure is in the second position;

a blocker door pivotally engaged to the translating member and constructed and arranged to rotate from a first state when the translating member is in the first condition and to a second state when the translating member is in the second condition;

a stationary structure;

a linkage engaged between the blocker door and the stationary structure, wherein the blocker door is disposed between the translating structure and the translating member when in a stowed state, and wherein the linkage has a first arm movably connected to the blocker door, a second arm movably connected to the first arm and the stationary structure, and a third atm movably connected to the second arm and the translating member;

a pivotal connection engaged to the blocker door and the translating member;

a first pivotal joint engaged to the blocker door and the first arm;

a second pivotal joint spaced from the first pivotal joint along the first arm and engaged to the first and second arms;

a third pivotal joint spaced from the second pivotal joint along the second arm and engaged to the second arm and the stationary structure;

a fourth pivotal joint engaged to the translating member and the third arm; and a fifth pivotal joint spaced from the fourth pivotal joint along the third arm and engaged to the second and third arms.

4. The thrust reverser set forth in claim 3 wherein the translating structure is at least in-part cylindrical and concentric to an axis and the blocker door defines in-part the flowpath when diverted.

5. The thrust reverser set forth in claim 4 further comprising:

a stationary inner shell opposing the translating structure and defining in-part the flowpath; and wherein the blocker door includes and spans between a forward edge portion and a distal edge, the pivotal connection is engaged to the forward edge portion, and the distal edge is proximate to the inner shell when in a deployed state for diverting the flowpath.

6. The thrust reverser set forth in claim 4 wherein the translating structure and the translating member are constructed and arranged to move telescopically with respect to one-another.

7. A thrust reverser for a turbofan engine comprising:

a stationary structure;

a translating structure movably engaged to the stationary structure;

a translating member in moving relationship to the stationary structure and the translating structure such that the translating member moves independently of the translating structure; and a blocker door device including a blocker door movably engaged to the translating member and a linkage movably engaged to the stationary structure, the translating member and the blocker door, wherein the linkage comprises a drag-less linkage;

wherein the translating structure includes a pressure sleeve, and when in a forward position the pressure sleeve radially inwardly defines at least in-part a flowpath and the blocker door device is disposed radially outward from the pressure sleeve.

8. The thrust reverser set forth in claim 7 wherein the blocker door is pivotally engaged to the translating member.

9. The thrust reverser set forth in claim 8 wherein the linkage is pivotally engaged to the stationary structure, the translating member and the blocker door.

10. The thrust reverser set forth in claim 7 wherein the translating structure and the translating member move linearly and along a common direction.

11. The thrust reverser set forth in claim 9 wherein the translating structure and the translating member move along a common axis.

* * * * *